United States Patent [19]

Fuoco et al.

[11] Patent Number: 5,537,600
[45] Date of Patent: Jul. 16, 1996

[54] PERSONAL COMPUTER WITH ALTERNATE SYSTEM CONTROLLER

[75] Inventors: Daniel P. Fuoco; Luis A. Hernandez; Eric Mathisen, all of Boca Raton, Fla.; Dennis L. Moeller, Delray Beach, Fla.; Jonathan H. Raymond, Essex Junction, Vt.; Esmaeil Tashakori, Delray Beach, Fla.

[73] Assignee: International Business Machines Corporation, Armonk, N.Y.

[21] Appl. No.: 706,425

[22] Filed: May 28, 1991

[51] Int. Cl.⁶ ...................................................... G06F 15/76
[52] U.S. Cl. .................... 395/800; 364/929.2; 364/929.5; 364/DIG. 2
[58] Field of Search ....................................... 395/800, 275, 395/500, 325; 371/9.1, 11.1, 11.3; 364/929.2, 929.5, DIG. 2

[56] References Cited

U.S. PATENT DOCUMENTS

| | | | |
|---|---|---|---|
| 4,703,420 | 10/1987 | Irwin | 395/800 |
| 4,835,737 | 5/1989 | Herrig et al. | 395/325 |
| 5,038,320 | 8/1991 | Heath et al. | 395/275 |
| 5,109,517 | 4/1992 | Houda et al. | 395/800 |
| 5,121,486 | 6/1992 | Kurihara et al. | 395/325 |
| 5,155,729 | 10/1992 | Rysko et al. | 371/9.1 |
| 5,297,272 | 3/1994 | Lu et al. | 395/500 |

Primary Examiner—Alyssa H. Bowler
Assistant Examiner—John E. Harrity
Attorney, Agent, or Firm—Daniel E. McConnell

[57] ABSTRACT

This invention relates to personal computers, and more particularly to personal computers in which capability is provided for the usual system controlling processor to be reset, initialized and then isolated if an alternate system controller is provided for the system. In accordance with this invention, a personal computer system has a high speed local processor data bus; an input/output data bus; a microprocessor coupled directly to the local processor bus; a connector coupled directly to the local processor bus for accommodating reception of an alternate processor; and a bus interface controller coupled directly to the local processor bus and directly to the input/output data bus for providing communications between the local processor bus and the input/output data bus, with the bus interface controller providing for detection of the presence of an alternate processor received in the connector and, in response to detection of the presence of an alternate processor, transferring control of the local processor bus from the microprocessor to the alternate processor.

15 Claims, 5 Drawing Sheets

PERSONAL COMPUTER WITH ALTERNATE SYSTEM CONTROLLER

FIELD AND BACKGROUND OF DISCLOSURE

This invention relates to personal computers, and more particularly to personal computers in which capability is provided for the usual system controlling processor to be reset, initialized and then isolated if an alternate system controller is provided for the system.

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, L40SX, 50, 55, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. In the beginning, the Family I models typically used the popular INTEL 8088 or 8086 microprocessor as the system processor. These processors have the ability to address one megabyte of memory. Later Family I models and the Family II models typically use the higher speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

As personal computer technology has developed and moved from eight to sixteen and eventually thirty two bit wide bus interaction and higher speed microprocessors capable of real and protected mode operation, performance capability has been sought by separating the architecture of the personal computer into varying bus areas. More specifically, in the original IBM PC, what came to be known as the expansion bus was essentially a direct extension of the microprocessor (8086 or 8088) connections, buffered and demultiplexed as required. Later, as the AT bus specification was developed and came into wide use (now being also known as the Industry Standard Architecture or ISA), it became possible to sever the nearly direct connection between the microprocessor and the bus, giving rise to the presence of what became known as the local processor bus and the renaming of the expansion bus as the input/output bus. Typically, in order to enhance performance, the local processor bus runs at a higher clock speed (typically expressed in Hertz) than does the input/output bus. The IBM AT architecture also opened the possibility of running more than one microprocessor on the input/output bus, through use of direct memory access (DMA) interrupts.

As enhanced performance capability has continued to be a goal, and as faster clock speeds have become attainable for microprocessors, strategies have evolved in which it has become desirable to accommodate alternate system controllers which may, under appropriate circumstances, assume control of systems into which the controllers are inserted. For example, the provision of a processor upgrade card or board is one example of such a strategy. Heretofore, such strategies have usually contemplated the substitution of the upgraded component for the component previously used. Such substitution is acceptable where components are received in socket connectors permitting ready interchange. However, where components are soldered in place on circuit boards (as is the case with a surface mount Intel 80386SX) such substitution is less feasible or impossible. In particular, mere addition of another device normally will result in unacceptable contention for control of system resources and bus access.

BRIEF DESCRIPTION OF THE INVENTION

With the foregoing in mind, it is an object of this invention to provide for the use of an alternate system controller (such as an upgraded processor) while maintaining the prior system controller. In realizing this object of the present invention, a system is configured for identifying the presence of an alternate system controller and, in the presence of such a controller, resetting, initializing and isolating the prior system controller if an alternate system controller is attached to the system.

A further object of this invention is to provide for the use of an alternate system controller which may later be removed, after which the system returns without further effort to use of the prior system controller. In realizing this object of the present invention, provision is made for the use of a number of types of alternate system controllers, specifically including emulators which may be used only temporarily as an aid in development.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
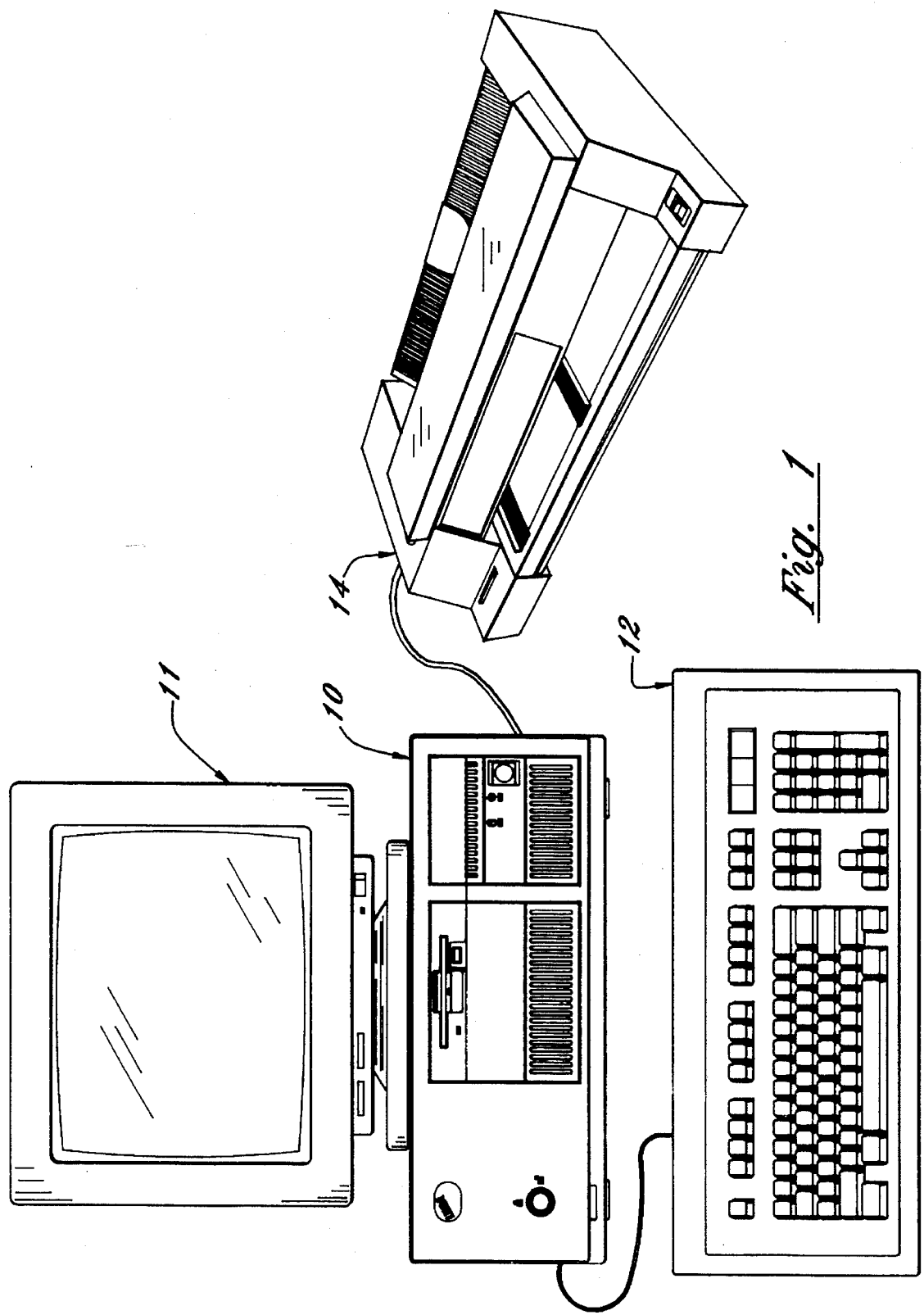
FIG. 1 is a perspective view of a personal computer embodying this invention.
Figure 2:
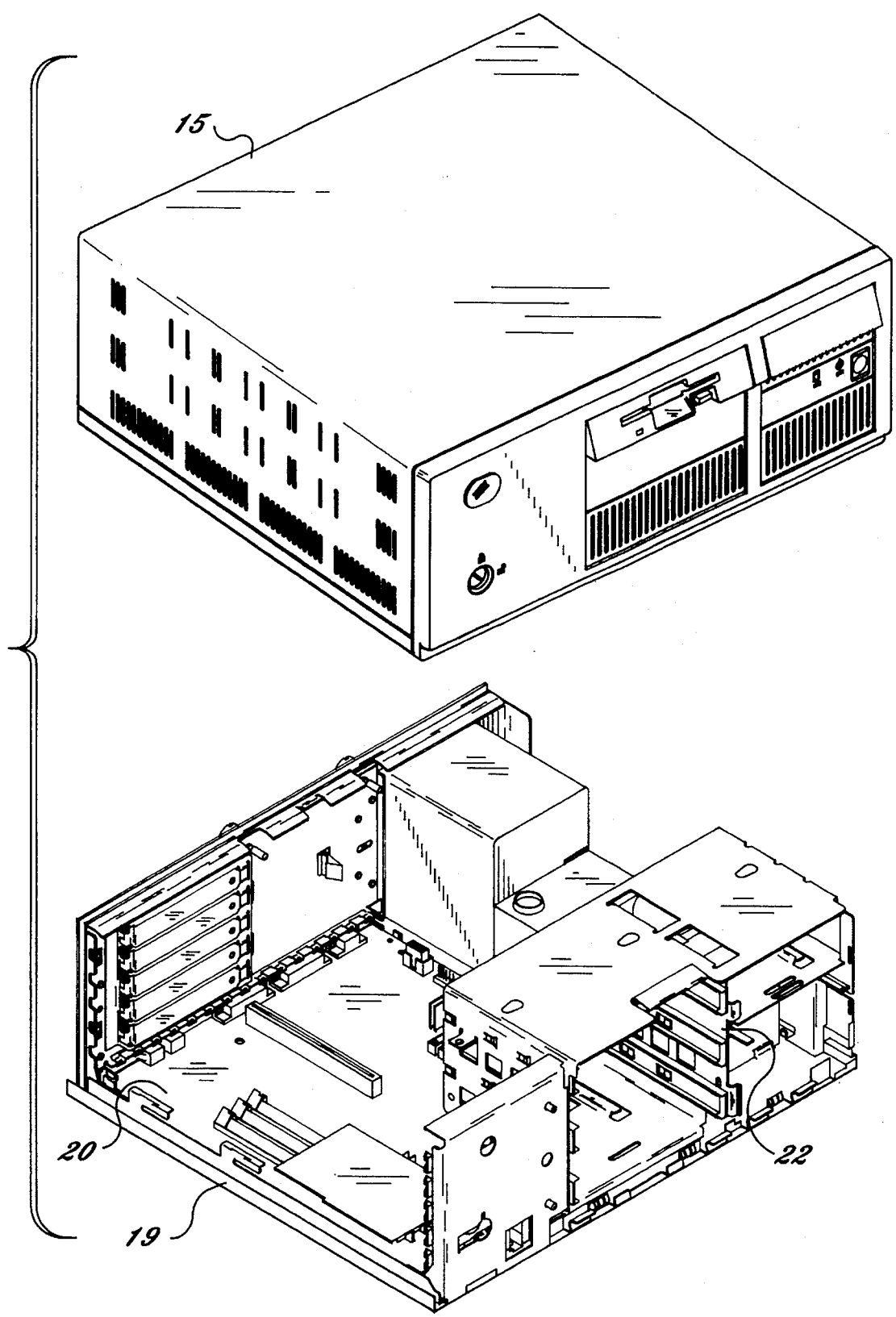
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
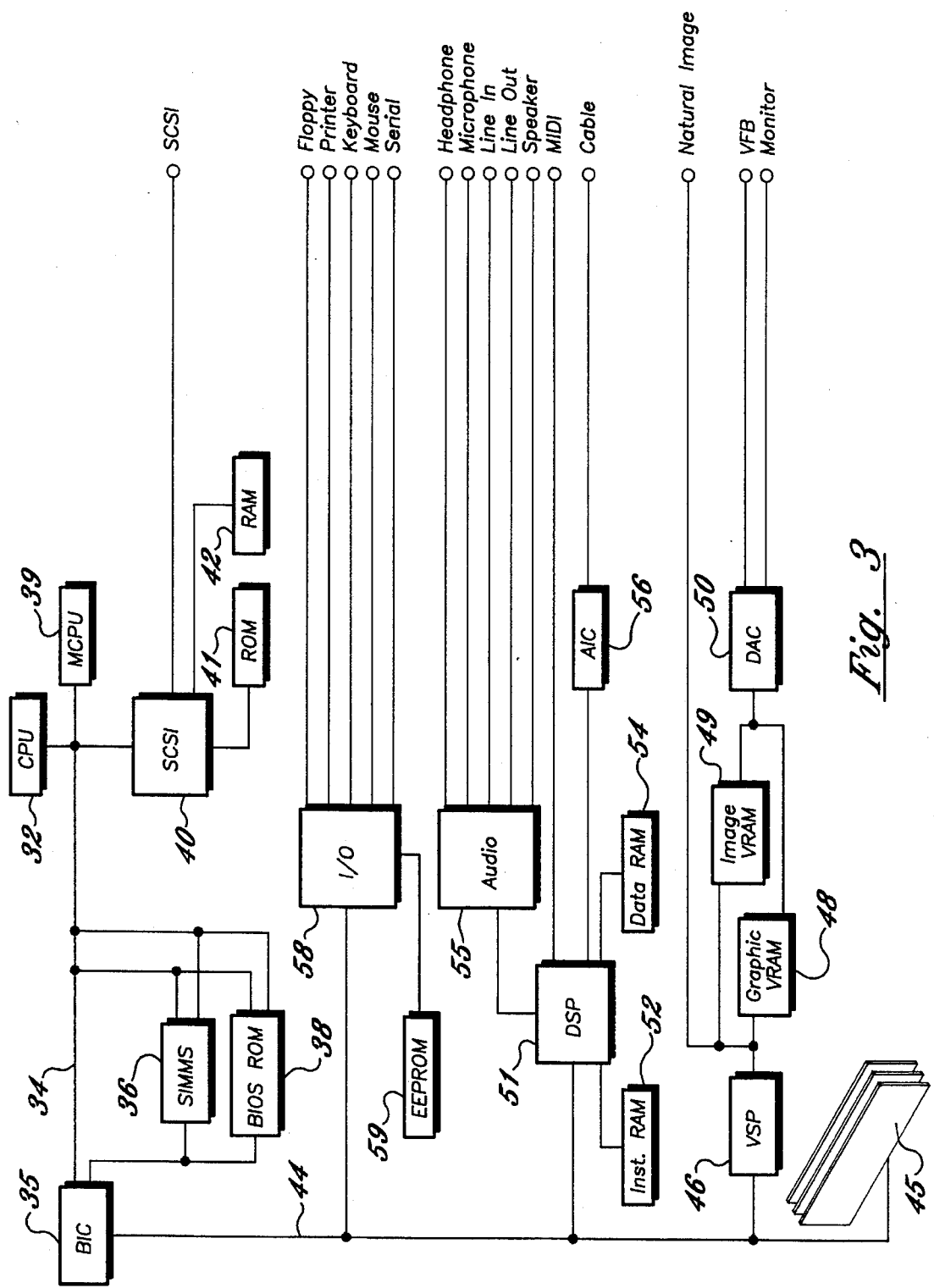
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in ROM 38 can be copied into RAM 36 to decrease the execution time of BIOS.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80486 microprocessor.

Returning now to FIG. 3, the CPU local bus 34 (comprising data, address and control components) also provides for the connection of the microprocessor 32 with a numeric or math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

The bus interface controller (BIC) 35 couples the CPU local bus 34 with an I/O bus 44 and functions as a protocol translator, memory controller and DMA controller among other functions. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components. The I/O bus 44 may be configured to bus specifications other than the MICRO CHANNEL specification.

Coupled along the I/O bus 44 are a variety of I/O components such as a video signal processor 46 which is associated with video RAM (VRAM) for storing character based information (indicated at 48) and for storing graphic or image based information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port.

Before turning in greater detail to a description of the functions provided for the personal computer 10, it is appropriate to first consider the support by a personal computer of what have been known as multiple masters or bus masters. As here used, a "master" is a processor or any circuit designed to gain control over a bus and drive address, data and control signals on the bus. Having such capability enables a master device to transfer information between system memory and other devices.

It has been proposed that masters be divided among three types—system master (usually the CPU), DMA controller, and bus master. The system master controls and manages the system configuration. It is usually the default master in the system. The default master owns the bus when no other master requires it. A DMA master is a special type of master which transfers data between DMA slaves and memory slaves, and does not arbitrate for the bus but services the DMA slave that is the arbitrator. As here used, a bus master arbitrates for use of the bus and supports information transfers with an I/O slave or memory slave.

What makes a device a "bus master" can be confusing, as bus masters do not necessarily require a processor. Also, a bus master may be called on to respond as a slave when accessed by another bus master. A bus master is distinguished by the capability of gaining control of the bus through arbitration and controlling the execution of a defined bus cycle. Generally, there are three types of bus masters: full function, special function controllers, and programmable special function controllers. The fundamental differences among them are degrees of flexibility, function and cost. The full function bus master is the most flexible, has the most function, and costs most. Typically, a full function bus master will have its own programmable CPU and be capable of controlling all system resources, including operating system software. Special function controllers have the least flexibility, function and cost. Typically, a special function controller will use logic circuits but no CPU to perform a specific function while requiring little or no assistance from other masters. Programmable special function controllers span the range between the other two. The fundamental difference between special function and programmable special function controllers is the ability to modify the function and/or execution characteristics of the bus master. Such modification can be accomplished through use of processing units or through settable registers.

Within the definitions here given, the CPU 32 and SCSI controller 40 may function as masters directly coupled to or on the local bus 34, while the I/O controller 58, DSP 51, VSP 46 and possibly accessory boards 45 mounted in the MICRO CHANNEL slots may all function as masters directly coupled to or on the input/output bus 44.

In accordance with the present invention, the possibility is opened of having an alternate system controller directly coupled to or on the local processor bus and effective to isolate the normal system processor (the CPU 32) when present. A personal computer in accordance with this invention has a connector coupled directly to the local processor bus 34 for accommodating reception of an alternate processor. Further, the bus interface controller 35 described hereinabove provides for detection of the presence of an alternate processor received in the connector and, in response to detection of the presence of an alternate processor, for transferring control of the local processor bus from the microprocessor to an alternate processor mounted in the connector.

In a preferred form of the present invention, advantage is taken of the packaging of a numeric co-processor such as the math co-processor 39 in a plastic leaded chip carrier. It has become conventional to provide a connector for such a device in the form of a socket which uses the two outer rows of an 11×11 pin grid array type footprint. The presence of the MCPU 39 in FIG. 3 would normally be accomodated through use of such a socket connector and possibly an intermediate adapter connector. A typical numeric co-processor uses less than all of the one hundred twenty one possible pin connections in such a socket, typically using sixty eight. However, those connections normally include the local processor bus data signals and several control signals. Thus by bringing additional signals into the connector pin locations and packaging alternate system controllers to use all active pin locations in such a connector, all signals necessary to implementation of this invention as described hereinafter become available.

Figure 4:
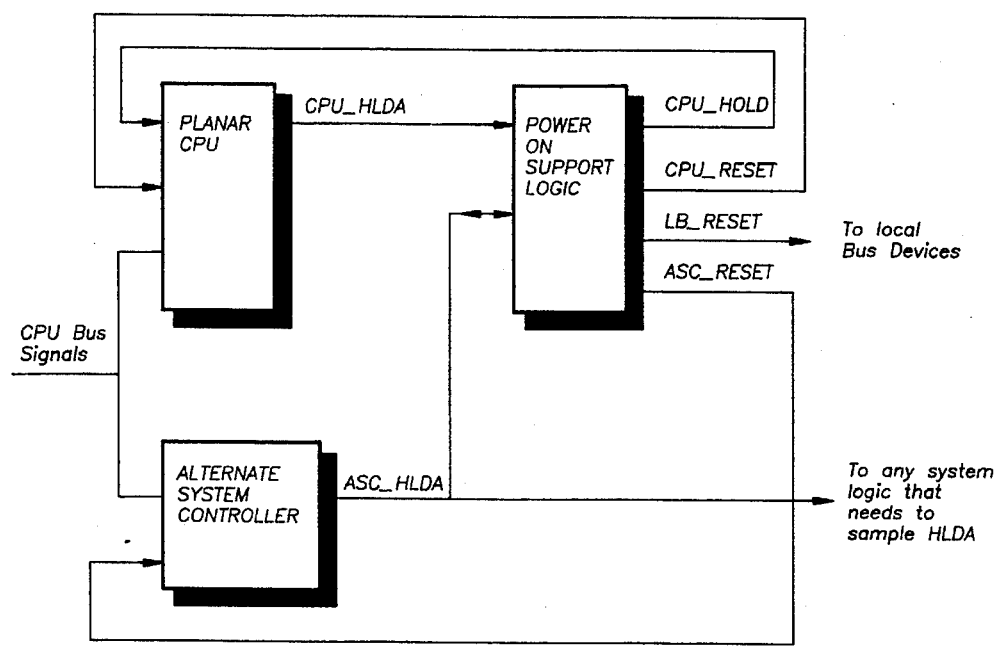
FIG. 4 is schematic representation of certain interconnections among a microprocessor which is the usual system controller and an alternate system controller as contemplated by this invention.

In particular, and referring now to FIG. 4, the present invention provides that local processor bus 34 signals be available to both the CPU 32 and to an alternate system controller 60, if mounted in the socket connector described above. Both the normal system controller 32 and the alternate system controller 60 are coupled to and with the bus interface controller 35, which performs among other functions the function of providing logic support for power on and reset functions. For additional information, the interested reader is directed to related U.S. application Ser. No. 711,672, filed 6 Jun. 1991, now abandoned, and owned in common with this invention. To any extent necessary or appropriate to a full understanding of this invention, those co-pending applications are hereby incorporated by reference into the present description.

After the application of power to the personal computer 10, the power supply drives all direct current power levels active for a predetermined minimum interval of time before supplying a POWER_GOOD signal to the power on support logic. When the logic finds POWER_GOOD active, the BIC 35 drives reset signals to local bus devices, the CPU 32, and the alternate system controller (hereafter sometimes "ASC") and a HOLD signal to the CPU 32 active. The interested reader is referred to Intel microprocessor specifications for more information regarding reset signals, if desired. Reset signals are typically level sensitive synchronous signals, and have requirements for setup and hold times which must be met in order to assure proper operation of the CPU 32, ASC 60 and the like.

Figure 5:
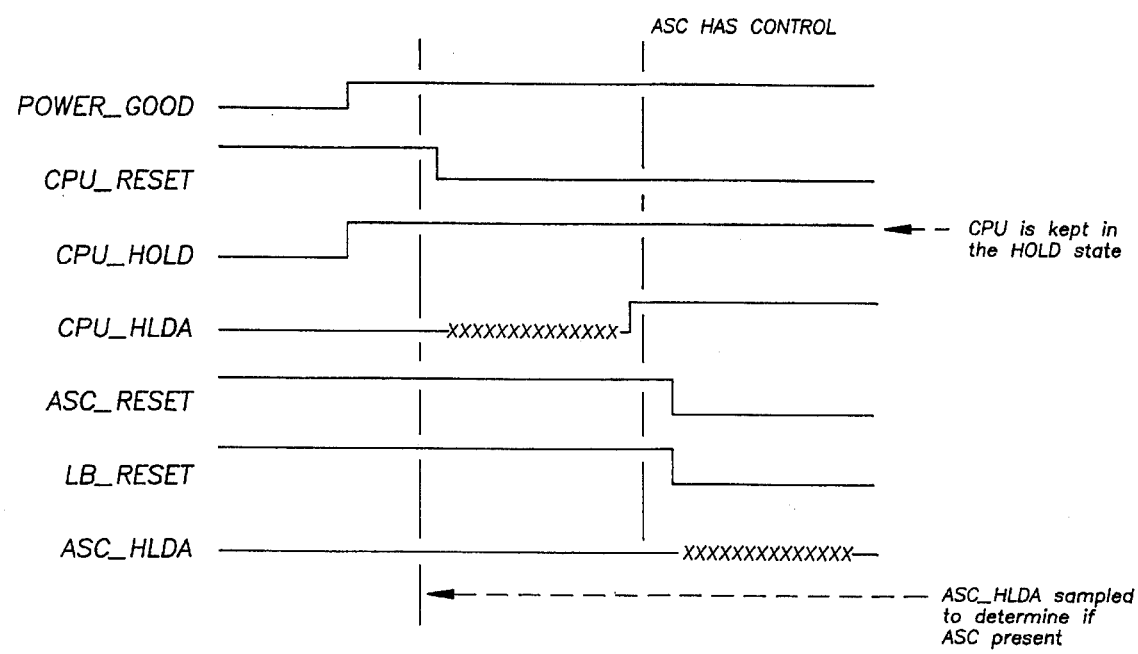
FIGS. 5 and 5 are signal charts illustrating operation of the personal computer of FIGS. 3 and 4 when an alternate system controller is present and when an alternate system controller is absent.

After a predetermined time interval allowing for assured recognition of the signals by the CPU 32 and ASC 60 and for resetting of the CPU 32 to a known state, the BIC 35 samples an alternate system controller hold acknowledge signal (hereafter, and in FIG. 4, "ASC_HLDA"). If ASC_HLDA is sampled low (the event of FIG. 5), then an alternate system controller is recognized as being present in the system and causes the BIC 35 to drive CPU_RESET low. The CPU 32 will finish its internal initialization and drive a central processor unit hold acknowledge signal (hereafter, and in FIG. 4, "CPU_HLDA") high. When CPU_HLDA is sampled high, reset signals including ASC_RESET are driven inactive, and the CPU 32 is barred from control of the local processor bus 34 while the ASC 60 gains such control.

Figure 6:
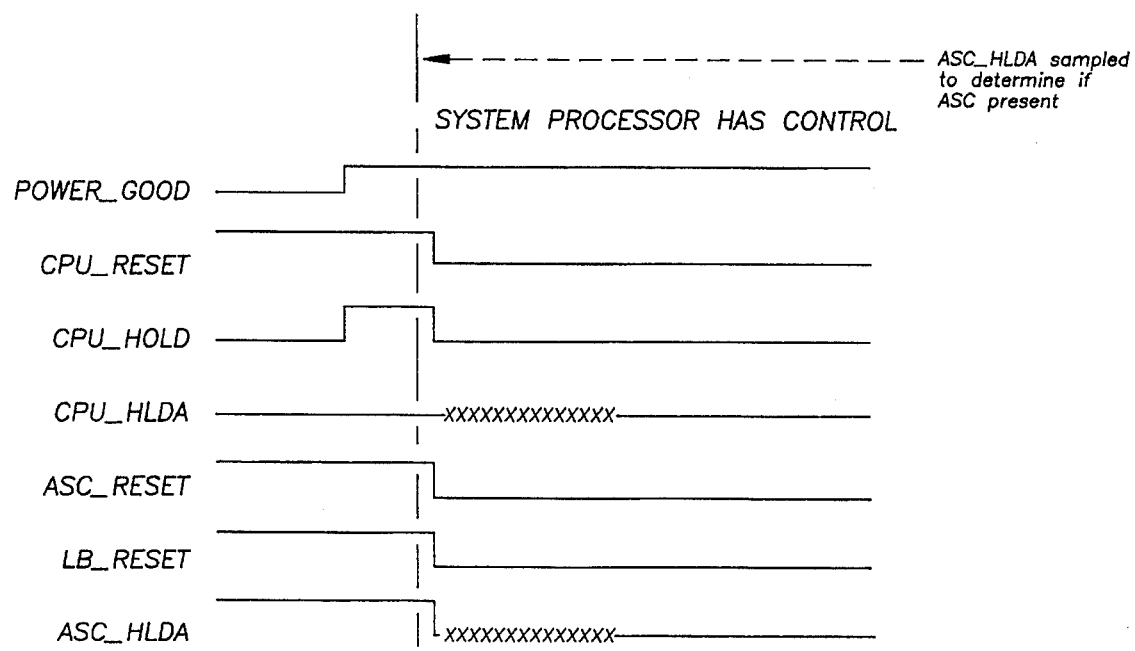

In a different sequence of events, shown in FIG. 6, the BIC 35 recognizes the absence of an ASC 60 when ASC_HLDA is sampled high, and all reset signals and CPU_HOLD are thereafter driven inactive. After the system processor completes initialization, it takes control of the local processor bus 34 and the system. The BIC 35 will drive ASC_HLDA with whatever signal is received from CPU_HLDA, allowing either signal to be used by any system logic which need to monitor the state of such a HLDA signal.

The present invention contemplates that the alternate system controller may take one of several forms. In particular, the ASC 60 may be an in circuit emulator used for testing and evaluation of the computer system 10 and of software operating on the system. Alternatively, the ASC 60 may be a cache processor subsystem allowing for cache handling of data and performance comparisons without change in the CPU 32. Further, the ASC 60 may be an upgraded processor enhancing the performance of the system 10. In any such instance, the present invention enables such an ASC, when present, to cause the CPU 32 to be reset, initialized, and then isolated from the local processor bus 34 while the ASC gains control over the system.

In the drawings and specifications there has been set forth a preferred embodiment of the invention and, although specific terms are used, the description thus given uses terminology in a generic and descriptive sense only and not for purposes of limitation.

What is claimed is:

1. A personal computer system comprising:

a high speed local processor data bus;

an input/output data bus;

a microprocessor coupled directly to said local processor bus;

a connector coupled directly to said local processor bus for accommodating reception of an alternate processor; and a bus interface controller coupled directly to said local processor bus and directly to said input/output data bus for providing communications between said local processor bus and said input/output data bus, said bus interface controller detecting whether an alternate processor is present in said connector and, in response to detection of the presence of an alternate processor, transferring control of said local processor bus from said microprocessor to said alternate processor.

2. A personal computer system according to claim 1 further comprising an alternate system controller mounted in said connector.

3. A personal computer system according to claim 2 wherein said alternate system controller is an in circuit emulator.

4. A personal computer system according to claim 2 wherein said alternate system controller is a cache processor.

5. A personal computer system according to claim 2 wherein said alternate system controller is a high performance microprocessor.

6. A personal computer system comprising:

a high speed data bus;

an input/output data bus;

a microprocessor coupled to said high speed data bus;

volatile memory coupled to said high speed data bus for volatile storage of data;

storage memory devices for nonvolatile storage of data;

a connector coupled directly to said high speed data bus for accommodating reception of an alternate processor;

a storage controller coupled to said high speed data bus and to said storage memory devices for regulating communications with said storage memory devices; and a bus interface controller coupled to said high speed data bus and to said input/output data bus for providing communications between said high speed data bus and said input/output data bus, said bus interface controller detecting whether an alternate processor is present in said connector and, in response to detection of the presence of an alternate processor, transferring control of said local processor bus from said microprocessor to said alternate processor.

7. A personal computer system according to claim 6 further comprising an alternate system controller mounted in said connector.

8. A personal computer system according to claim 7 wherein said alternate system controller is an in circuit emulator.

9. A personal computer system according to claim 7 wherein said alternate system controller is a cache processor.

10. A personal computer system according to claim 7 wherein said alternate system controller is a high performance microprocessor.

11. A personal computer system comprising:

a high speed data bus;

a microprocessor coupled directly to said high speed data bus;

a connector coupled directly to said high speed data bus for accommodating reception of an alternate processor;

volatile memory coupled directly to said high speed data bus for volatile storage of data;

storage memory devices for nonvolatile storage of data;

a storage controller coupled directly to said high speed data bus and to said storage memory devices for regulating communications with said storage memory devices;

an input/output data bus;

an input/output controller coupled directly to said input/output data bus;

a digital signal processor coupled directly to said input/output data bus;

a video signal processor coupled directly to said input/output data bus; and a bus interface controller coupled to said high speed data bus and to said input/output data bus for providing communications between said high speed data bus and said input/output data bus, said bus interface controller detecting whether an alternate processor is present in said connector and, in response to detection of the presence of an alternate processor, transferring control of said local processor bus from said microprocessor to said alternate processor.

12. A personal computer system according to claim 11 further comprising an alternate system controller mounted in said connector.

13. A personal computer system according to claim 12 wherein said alternate system controller is an in circuit emulator.

14. A personal computer system according to claim 12 wherein said alternate system controller is a cache processor.

15. A personal computer system according to claim 12 wherein said alternate system controller is a high performance microprocessor.

* * * * *